US011909271B2

(12) United States Patent
Nomoto et al.

(10) Patent No.: US 11,909,271 B2
(45) Date of Patent: Feb. 20, 2024

(54) ROTATING MACHINE, OUTDOOR UNIT OF AIR CONDITIONING APPARATUS, AND AIR CONDITIONING APPARATUS

(71) Applicant: Mitsubishi Electric Corporation, Tokyo (JP)

(72) Inventors: Kazuma Nomoto, Tokyo (JP); Hiroki Aso, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 470 days.

(21) Appl. No.: 17/292,049

(22) PCT Filed: Jan. 17, 2019

(86) PCT No.: PCT/JP2019/001287
§ 371 (c)(1),
(2) Date: May 7, 2021

(87) PCT Pub. No.: WO2020/148866
PCT Pub. Date: Jul. 23, 2020

(65) Prior Publication Data
US 2021/0399601 A1 Dec. 23, 2021

(51) Int. Cl.
*H02K 1/30* (2006.01)
*H02K 1/276* (2022.01)
(Continued)

(52) U.S. Cl.
CPC .............. *H02K 1/30* (2013.01); *H02K 1/276* (2013.01); *H02K 7/003* (2013.01); *H02K 7/14* (2013.01);
(Continued)

(58) Field of Classification Search
CPC .......... H02K 1/276; H02K 1/30; H02K 7/003; H02K 7/14; H02K 21/14; F24F 1/0003; F24F 1/38
See application file for complete search history.

(56) References Cited

U.S. PATENT DOCUMENTS 4,506,181 A * 3/1985 Jones ..................... H02K 1/276
310/211
6,404,086 B1 6/2002 Fukasaku et al.
(Continued)

FOREIGN PATENT DOCUMENTS

DE 11 2013 004 905 T5 7/2015
JP H10-094231 A 10/1998
(Continued)

OTHER PUBLICATIONS

International Search Report of the International Searching Authority dated Mar. 12, 2019 for the corresponding International application No. PCT/JP2019/001287 (and English translation).
(Continued)

*Primary Examiner* — Jue Zhang
(74) *Attorney, Agent, or Firm* — POSZ LAW GROUP, PLC

(57) ABSTRACT

A rotating machine includes: an electric motor that includes a stator and a rotor that is rotatable relative to the stator; a rotary member to be rotated that is provided on the shaft; and a fastening member made of magnetic material and provided to fasten the rotary member to a shaft. The rotor includes: a rotor core made of magnetic material; a plurality of permanent magnets attached to the rotor core such that the permanent magnets are spaced from each other in a circumferential direction and magnetic poles of the permanent magnets that face an outer peripheral side of the rotor core in a radius direction of the rotor core have the same magnetic polarity; and the shaft. The shaft is made of magnetic
(Continued)

material, provided to extend through a central part of the rotor core in an axial direction of the rotor core, and magnetized by part of magnetic fluxes generated from the permanent magnets.

9 Claims, 6 Drawing Sheets

(51) Int. Cl.
*H02K 7/14* (2006.01)
*F24F 1/0003* (2019.01)
*H02K 7/00* (2006.01)
*H02K 21/14* (2006.01)
*F24F 1/38* (2011.01)

(52) U.S. Cl.
CPC ............ *H02K 21/14* (2013.01); *F24F 1/0003* (2013.01); *F24F 1/38* (2013.01)

(56) References Cited

U.S. PATENT DOCUMENTS

| | | |
|---|---|---|
| 2015/0226489 A1 | 8/2015 | Higashiiue |
| 2017/0317567 A1* | 11/2017 | Cho ................... H02K 1/2706 |
| 2019/0173337 A1 | 6/2019 | Shimokawa et al. |
| 2019/0190337 A1* | 6/2019 | Shono ................... H02K 9/08 |
| 2019/0368629 A1* | 12/2019 | Yokoe ................... H02K 1/278 |
| 2020/0251944 A1 | 8/2020 | Watanabe |

FOREIGN PATENT DOCUMENTS

| | | |
|---|---|---|
| JP | 2013-017261 A | 1/2013 |
| WO | 2018/011979 A1 | 7/2016 |
| WO | 2018/158930 A1 | 9/2018 |

OTHER PUBLICATIONS

Office Action dated Aug. 30, 2023 issued in corresponding DE Patent Application No. 112019006680.3 (and English translation).

* cited by examiner

ROTATING MACHINE, OUTDOOR UNIT OF AIR CONDITIONING APPARATUS, AND AIR CONDITIONING APPARATUS

CROSS REFERENCE TO RELATED APPLICATION

This application is a U.S. national stage application of PCT/JP2019/001287 filed on Jan. 17, 2019, the contents of which are incorporated herein by reference.

TECHNICAL FIELD

The present disclosure relates to a rotating machine, an outdoor unit of an air-conditioning apparatus, and an air-conditioning apparatus.

BACKGROUND ART

In existing outdoor units of air-conditioning apparatuses, a propeller fan and an electric motor are provided to operate as an air-sending device that sends air to a heat exchanger. The propeller fan is fastened to a distal end portion of a shaft of the electric motor by a nut (see, for example, Patent Literature 1). Thus, when the electric motor is driven, the propeller fan is rotated.

CITATION LIST

Patent Literature

Patent Literature 1: Japanese Unexamined Patent Application Publication No. H10-94231 (FIGS. 15 and 16)

SUMMARY OF INVENTION

Technical Problem

When the propeller fan is started or stopped by the electric motor, a greater torque is instantaneously generated by inertial force due to starting or stopping of the propeller fan than during continuous operation. If the torque exceeds frictional force on a thread face and a seating face of the nut, the nut that fastens the propeller fan is loosened. Thereafter, when starting and stopping of rotation of the electric motor are repeated, it is possible that the nut will be further loosened, and finally, the nut may be detached from the shaft, and the propeller fan may fall off.

The present disclosure is applied in view of the above circumstances, and relates to a rotating machine, an outdoor unit of an air-conditioning apparatus, and an air-conditioning apparatus that are formed capable of preventing a rotary member to be rotated, such as a propeller fan, from easily falling off a shaft of an electric motor.

Solution to Problem

According to a first aspect of the present disclosure, a rotating machine includes: an electric motor that includes a stator and a rotor that is rotatable relative to the stator; a rotary member to be rotated that is provided on a shaft; and a fastening member made of magnetic material and provided to fasten the rotary member to the shaft. The rotor includes: a rotor core made of magnetic material; a plurality of permanent magnets attached to the rotor core such that the permanent magnets are spaced from each other in a circumferential direction and magnetic poles of the permanent magnets that face an outer peripheral side of the rotor core in a radius direction of the rotor core have the same magnetic polarity; and the shaft. The shaft is made of magnetic material, provided to extend through a central part of the rotor core in an axial direction of the rotor core, and magnetized by part of magnetic fluxes generated from the permanent magnets.

According to a second aspect of the present disclosure, an outdoor unit of an air-conditioning apparatus includes: an electric motor including a stator and a rotor that is rotatable relative to the stator; a fan provided on a shaft; a fastening member made of magnetic material and provided to fasten the fan to the shaft; a heat exchanger to which air is sent by rotation of the fan; and a housing that houses the electric motor, the fan, the fastening member, and the heat exchanger. The rotor includes: a rotor core made of magnetic material; a plurality of permanent magnets attached to the rotor core such that the permanent magnets are spaced from each other in a circumferential direction of the rotor core and magnetic poles of the permanent magnets that face an outer peripheral side of the rotor core in a radius direction of the rotor core have the same magnetic polarity, and the shaft. The shat is made of magnetic material, provided to extend through a central part of the rotor core in an axial direction of the rotor core, and magnetized by part of magnetic fluxes generated from the permanent magnets.

According to a third aspect of the present disclosure, an air-conditioning apparatus includes; an outdoor unit; and an indoor unit connected to the outdoor unit by a refrigerant pipe. The outdoor unit includes: an electric motor including a stator and a rotor that is rotatable relative to the stator, a fan provided on a shaft; a fastening member made of magnetic material and provided to fasten the fan to the shaft; a heat exchanger to which air is sent by rotation of the fan; and a housing that houses the electric motor, the fan, the fastening member, and the heat exchanger. The rotor includes: a rotor core made of magnetic material; a plurality of permanent magnets attached to the rotor core such that the permanent magnets are spaced from each other in a circumferential direction of the rotor core and magnetic poles of the permanent magnets that face outer peripheral side of the rotor core in a radius direction of the rotor core have the same magnetic polarity; and the shaft. The shaft is made of magnetic material, provided to extend through a central part of the rotor core in an axial direction of the rotor core, and magnetized by part of magnetic fluxes generated from the permanent magnets.

Advantageous Effects of Invention

In the rotating machine, the outdoor unit of the air-conditioning apparatus, and the air-conditioning apparatus as described above, the shaft is magnetized and the fastening member made of magnetic material is thus attracted by the shaft. As a result, a force exerted by the fastening member to fasten the rotary member such as a fan to the shaft is increased. Thus, the rotary member does not easily fall off the shaft.

DESCRIPTION OF EMBODIMENTS

A rotating machine, an outdoor unit of an air-conditioning apparatus, and an air-conditioning apparatus all according to an embodiment of the present disclosure will be described with reference to the above figures. In each of the figures, components that are the same as or equivalent to those in a previous figure or figures are denoted by the same reference signs.

Figure 1:
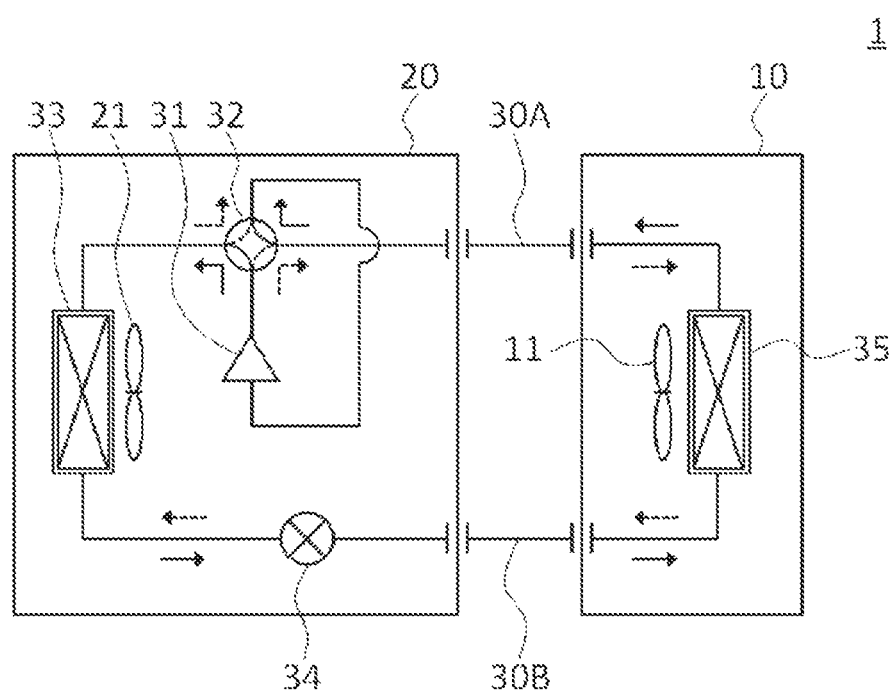
FIG. 1 is a schematic view illustrating a configuration of an air-conditioning apparatus according to an embodiment of the present disclosure.
Figure 2:
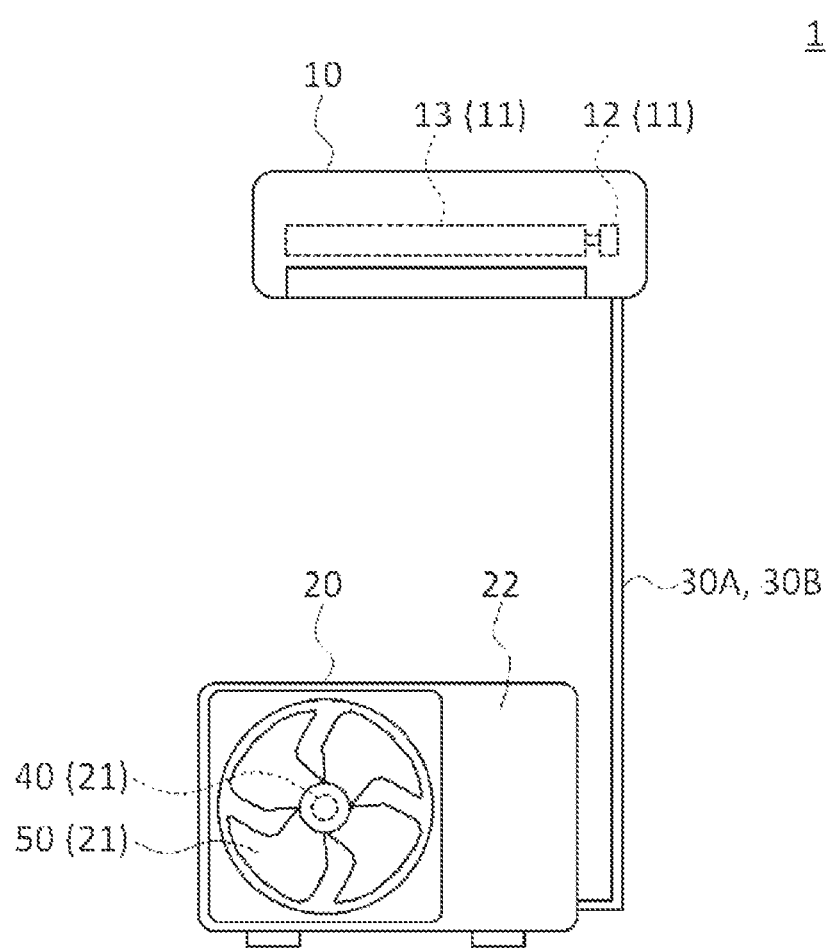
FIG. 2 is a schematic external view of an air-conditioning apparatus according to the embodiment of the present disclosure.

FIG. 1 is a schematic view illustrating a configuration of an air-conditioning apparatus 1 according to an embodiment of the present disclosure. In FIG. 1, solid arrows indicate the flow of refrigerant in the air-conditioning apparatus 1 during a cooling operation, and dashed arrows indicate the flow of the refrigerant in the air-conditioning apparatus 1 during a heating operation. FIG. 2 is a schematic external view of the air-conditioning apparatus 1, As illustrated in FIGS. 1 and 2, the air-conditioning apparatus 1 includes an indoor unit 10 and an outdoor unit 20. The indoor unit 10 and the outdoor unit 20 are connected to each other by a refrigerant pipe 30A and a refrigerant pipe 30B. In the air-conditioning apparatus 1, a compressor 31, a flow switching device 32, an outdoor heat exchanger 33, an expansion valve 34, and an indoor heat exchanger 35 are sequentially connected by refrigerant pipes. In the air-conditioning apparatus 1, the flow of the refrigerant is switched by the flow switching device 32, whereby the operation of the air-conditioning apparatus 1 is switched between a cooling operation in which cool air is sent from the indoor unit 10 and a heating operation in which warm air is sent from the indoor unit 10.

The indoor unit 10 includes the indoor heat exchanger 35 and an air-sending device 11. The indoor heat exchanger 35 causes heat exchange to be performed between the refrigerant and air that is to be subjected to air conditioning. During the cooling operation, the indoor heat exchanger 35 operates as an evaporator to evaporate and gasify the refrigerant. During the heating operation, the indoor heat exchanger 35 operates as a condenser to condense and liquefy the refrigerant. The indoor heat exchanger 35 is a fin-and-tube heat exchanger that is made of, for example, copper or aluminum. The air-sending device 11 includes an electric motor 12 and a fan 13. The fan 13 is attached to a shaft of the electric motor 12. When being driven by the electric motor 12, the fan 13 is rotated. The fan 13 is, for example, a cross flow fan. The air-sending device 11 is provided such that the air-sending device 11 and the indoor heat exchanger 35 face each other. When the fan 13 is rotated, a flow of air is generated and the air is sent to the indoor heat exchanger 35.

Figure 3:
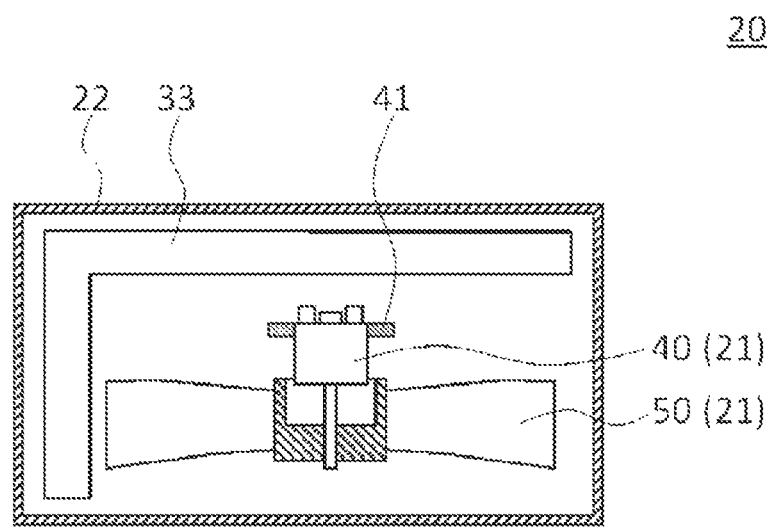
FIG. 3 is a schematic view illustrating related components of an outdoor unit according to the embodiment of the present disclosure.

FIG. 3 is a schematic view illustrating related components of the outdoor unit 20. The outdoor unit 20 includes the outdoor heat exchanger 33, an air-sending device 21, and a housing 22. The outdoor heat exchanger 33 causes heat exchange to be performed between outdoor (outside) air and the refrigerant. During the cooling operation, the outdoor heat exchanger 33 operates as a condenser to condense and liquefy the refrigerant. During the heating operation, the outdoor heat exchanger 33 operates as an evaporator to evaporate and gasify the refrigerant. The outdoor heat exchanger 33 is a fin-and-tube heat exchanger that is made of, for example, copper or aluminum. The outdoor heat exchanger 33 has, for example, an L-shaped horizontal section. The air-sending device 21 includes an electric motor 40 and a fan 50. When the electric motor 40 is driven, the fan 50 is rotated. The air-sending device 21 is located in such a manner as to face the outdoor heat exchanger 33. When the fan 50 is rotated, a flow of air is generated and sent to the outdoor heat exchanger 33. A configuration of the air-sending device 21 will be described in detail later.

The housing 22 houses the outdoor heat exchanger 33 and the air-sending device 21. The housing 22 is formed in the shape of a box and has an air inlet (not illustrated) through which air is sucked and an air outlet (not illustrated) through which the sucked air is blown out. The outdoor heat exchanger 33 is fixed to the housing 22 by a fastening member (not illustrated). The air-sending device 21 is fixed to the housing 22 by an electric motor support 41 joined to the electric motor 40 by screws or other fasteners. In the embodiment, as illustrated in FIG. 1, the compressor 31, the flow switching device 32, and the expansion valve 34 are also housed in the outdoor unit 20, that is, in the housing 22. The inside of the housing 22 is divided, for example, into an air-sending-device chamber and a machine chamber by a partition plate. The outdoor heat exchanger 33 and the air-sending device 21 are provided in the air-sending-device chamber, and the compressor 31, the flow switching device 32, and the expansion valve 34 are provided in the machine chamber.

The compressor 31 compresses sucked refrigerant into high-temperature and high-pressure refrigerant, and discharges the high-temperature and high-pressure refrigerant. The compressor 31 is a rotary compressor or a scroll compressor, for example. The flow switching device 32 is a device that switches the flow direction of the refrigerant between directions of the refrigerant. The flow switching device 32 is, for example, a four-way valve. The expansion valve 34 is an expansion device, and adjusts the flow rate of the refrigerant to adjust (reduce) the pressure of applied refrigerant. The expansion valve 34 is, for example, an electronic expansion valve whose opening degree can be changed in response to an instruction from a controller (not illustrated).

Figure 4:
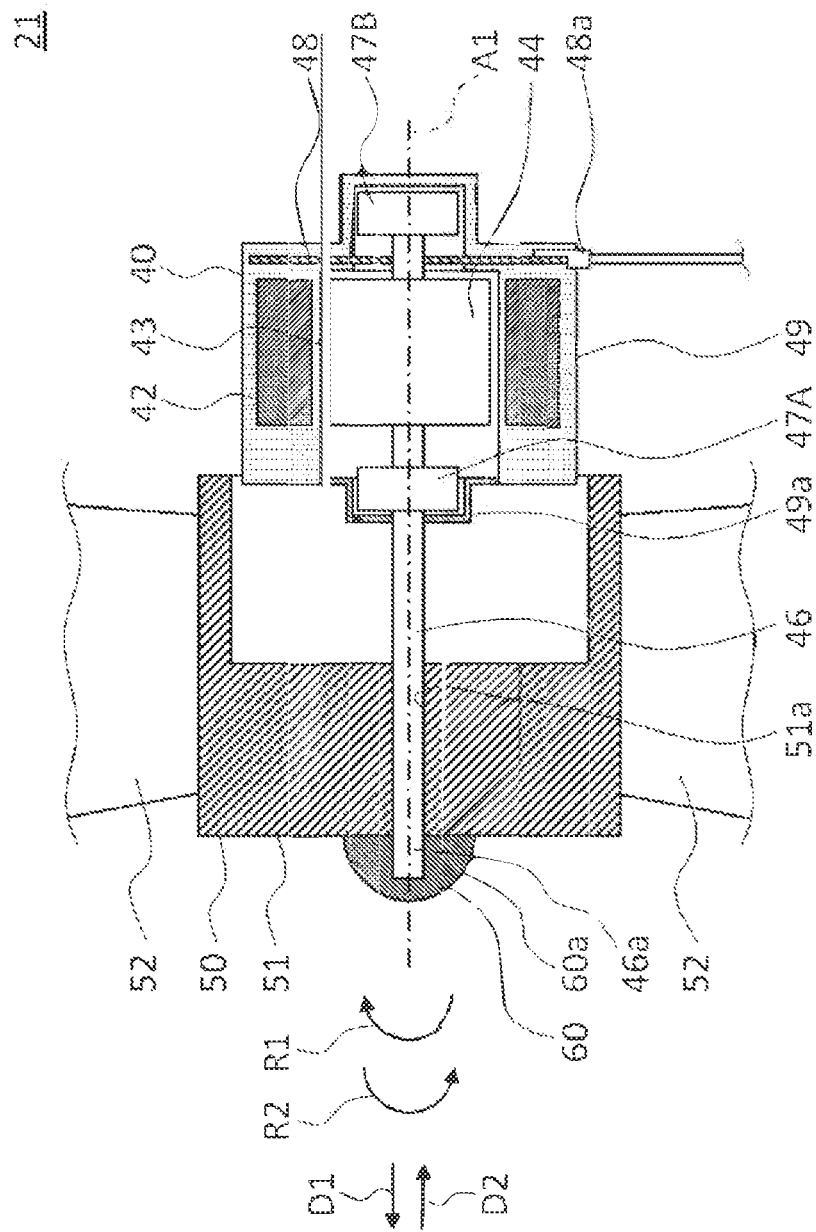
FIG. 4 is a schematic sectional view illustrating a configuration of an air-sending device according to the embodiment of the present disclosure.

Next, the configuration of the air-sending device 21 will be described. The air-sending device 21 is an example of a rotating machine according to the embodiment. FIG. 4 is a schematic sectional view illustrating the configuration of the air-sending device 21. As illustrated in FIG. 4, the air-sending device 21 includes the electric motor 40, the fan 50, and a nut 60.

The electric motor 40 includes a stator 42 and a rotor 43. The electric motor 40 is, for example, a brushless motor. The stator 42 includes a stator core that is annular around an axis A1 and a coil wound around the stator core. The stator core is made of soft magnetic material and is made up of, for example, a plurality of electromagnetic steel sheets that are stacked in a direction along the axis A1 (an axial direction). Each of the electromagnetic steel sheets has a thickness of, for example, 0.2 to 0.5 mm. The direction along the axis A1 will be hereinafter referred to as "axial direction," A direction along a circumference around the axis A1 will be referred to as "circumferential direction". A direction perpendicular to the axis A1 will be referred to as "radial direction." Of the radial direction, a direction toward the exterior is a direction away from the axis A1, and a direction toward the interior is a direction toward the axis A1.

Figure 5:
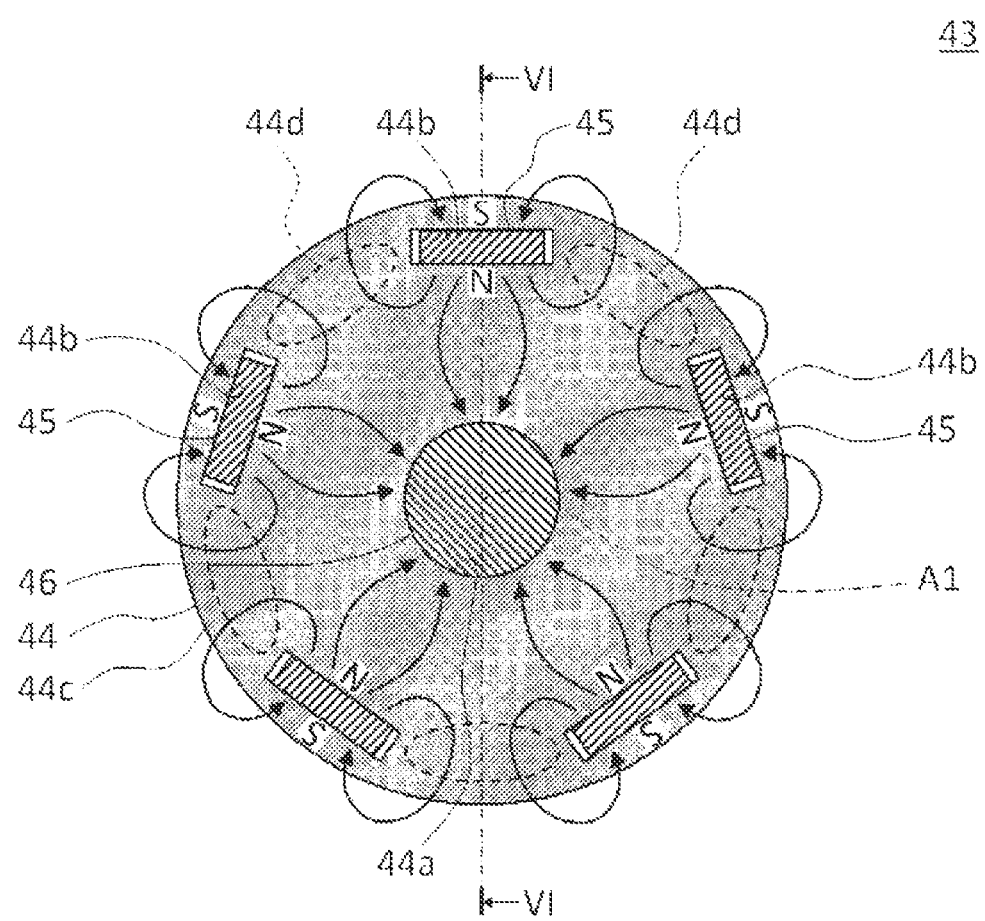
FIG. 5 is a cross-sectional view of a rotor of an electric motor in the air-sending device according to the embodiment of the present disclosure.

The rotor 43 is rotatable relative to the stator 42. More specifically, as illustrated in FIG. 4, the rotor 43 is provided inward of the stator 42, with a space interposed between the rotor 43 and the stator 42, and is also provided such that the rotor 43 can be rotated around the axis A1. The rotor 43 is a so-called consequent-pole type rotor. FIG. 5 is a cross-sectional view of the rotor 43 that is taken along a plane perpendicular to the axis A1. In FIG. 5, flows of magnetic fluxes are schematically illustrated by arrows. As illustrated in FIG. 5, the rotor 43 includes a rotor core 44, a plurality of permanent magnets 45, and a shaft 46.

The rotor core 44 is made of magnetic material. The rotor core 44 is made up of, for example, a plurality of electromagnetic steel sheets that are made of soft magnetic material and that are stacked in the axial direction. Each of the electromagnetic steel sheets has a thickness of, for example, 0.2 to 0.5 mm. In the embodiment, the rotor core 44 has a substantially cylindrical shape in such a manner as to extend in the axial direction. The rotor core 44 has a through-hole 44a and a plurality of magnet insertion holes 44b. The through-hole 44a is formed in a central part of the rotor core 44 and passes through the rotor core 44 in the axial direction. The shaft 46 is inserted in the through-hole 44a. The plurality of magnet insertion holes 44b are formed close to an outer peripheral surface 44c of the rotor core 44 and are arranged at regular intervals in the circumferential direction. The magnet insertion holes 44b extend through the rotor core 44 in the axial direction. Referring FIG. 5, five magnet insertion holes 44b are formed in the rotor core 44. In each of the magnet insertion holes 44b, at least an associated one of the permanent magnets 45 is inserted.

The permanent magnets 45 are attached to the rotor core 44 such that the permanent magnets 45 are spaced from each other in the circumferential direction and magnetic poles of the permanent magnets 45 that face an outer peripheral side of the rotor core 44 in the radial direction have the same magnetic polarity. In the embodiment, the five permanent magnets 45 are inserted in the respective five magnet insertion holes 44b. As a result, the five permanent magnets 45 are arranged at regular intervals in the circumferential direction. Each of the permanent magnets 45 is formed in the shape of a flat plate that is long in the axial direction, and has a width in the circumferential direction and a thickness in the radial direction, A dimension of each of the permanent magnets 45 in the axial direction is smaller than a dimension of each of the magnet insertion holes 44b in the axial direction. The permanent magnets 45 are magnetized in a direction along the thickness direction, and are provided, for example, such that the south magnetic poles of the permanent magnets 45 face the outer peripheral side in the radial direction and the north magnetic poles of the permanent magnets 45 face the inner peripheral side in the radial direction, Each of the permanent magnets 45 is a rare-earth magnet that contains, for example, neodymium, iron, and boron as main components.

As illustrated in FIG. 5, a magnetic flux generated from a surface of each of the permanent magnets 45 that is located on an inner side in the radial direction and that corresponds to the north magnetic pole repels a magnetic flux generated from a permanent magnet 45 that is adjacent to the above each permanent magnet 45 in the circumferential direction, and these magnetic fluxes move toward surfaces of the respective adjacent permanent magnets 45 that are located on an outer side in the radial direction and that correspond to the south magnetic poles of the respective permanent magnets. As a result, a pseudo magnetic pole is formed in a region 44d between the adjacent permanent magnets 45 in the rotor core 44. In an example as illustrated in FIG. 5, for the stator 42, the permanent magnets 45 serve as south poles, and pseudo magnetic poles generated in the regions 44d serve north poles. In other words, the rotor 43 has ten magnetic poles on the outer peripheral surface 44c of the rotor core 44, The ten magnetic poles are located such the polarities of the magnetic poles alternately vary in the circumferential direction. To be more specific, of the ten magnetic poles, five magnetic poles are the magnetic poles of the permanent magnets 45, and the other five magnetic poles are the pseudo magnetic poles that are each located in the region 44d between associated adjacent two of the permanent magnets 45 in the rotor core 44. In such a manner, in the rotor 43 that is of a consequent-pole type, the pseudo magnetic poles are generated at the rotor core 44, and the number of permanent magnets required for the electric motor can thus be decreased half that required for an electric motor having the same number of magnetic poles as the above electric motor. Accordingly, the manufacturing cost of the electric motor according to the embodiment can be reduced, since the number of permanent magnets, which are expensive, can be decreased.

The shaft 46 is provided in the central part of the rotor core 44 in such a manner as to extend in the axial direction. In the embodiment, the shaft 46 is substantially cylindrically shaped to have a central axis that coincides with the axis A1, and is inserted in the through-hole 44a in the rotor core 44. The shaft 46 is fit in the through-hole 44a, for example, and is thereby fixed to an inner side of the through-hole 44a. Thus, the shaft 46 is rotated together with the rotor core 44 on the axis A1 that is also the axis of rotation of the shaft 46. The shaft 46 is made of magnetic material. The shaft 46 is made of, for example, carbon steel that is soft magnetic material.

Figure 6:
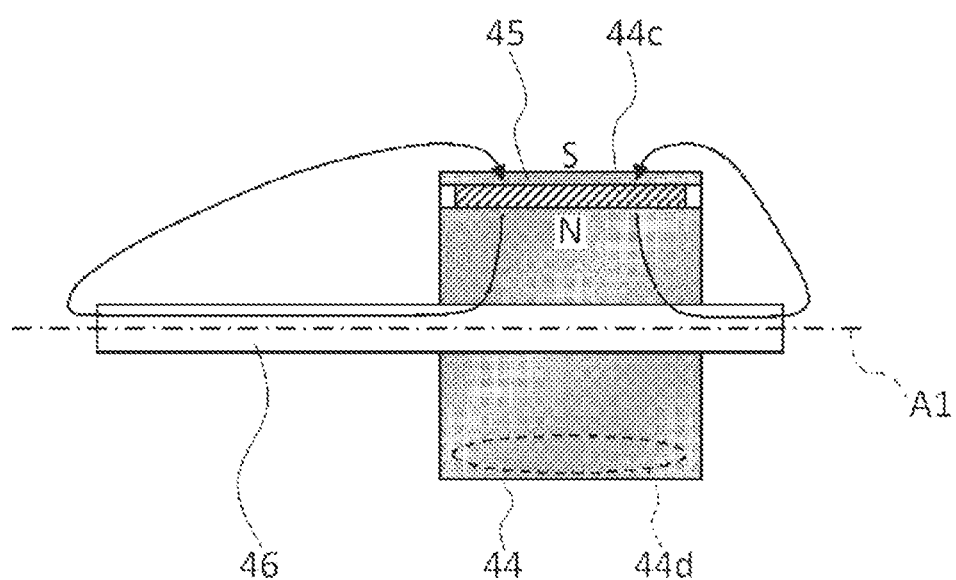
FIG. 6 is a sectional view taken along line VI-VI in FIG. 5.

The shaft 46 is magnetized by part of magnetic fluxes generated from the permanent magnets 45. FIG. 6 is a sectional view taken along line VI-VI in FIG. 5. In FIG. 6, arrows schematically indicate flows of the magnetic fluxes. As illustrated in FIGS. 5 and 6, part of magnetic fluxes generated from central parts of the permanent magnets 45 that are located at middle locations in the width direction of the permanent magnets 45 repels a surrounding magnetic field, and thus moves toward an internal side of the rotor core 44. Since the shaft 46 is made of magnetic material, the magnetic fluxes flow through the shaft 46 in the axial direction and flow from both ends of the shaft 46 to the permanent magnets 45 through the outer peripheral surface 44c of the rotor core 44. As a result, the entire shaft 46 is magnetized in the axial direction. The magnetic fluxes flow from the inside of the shaft 46 to the outside through surfaces of both end portions of the shaft 46. Thus, the shaft 46 has a strong magnetic force at the both end portions of the shaft 46, through which a large amount of magnetic fluxes pass per unit surface area. Since the shaft 46 is magnetized by the magnetic fluxes generated from the permanent magnets 45 in the above manner, preferably, a component that impedes the flows of the magnetic fluxes (for example, a component made of nonmagnetic material such as resin material) should not be provided between the rotor core 44 and the shaft 46.

As illustrated in FIG. 4, the shaft 46 is provided in such a manner as to protrude from the rotor core 44 in the axial direction. Referring to FIG. 4, the fan 50 is provided at part of the shaft 46 that protrudes from the rotor core 44 in a direction indicated by an arrow D1. A side of the shaft 46 on which the fan 50 is provided (a side of the direction indicated by the arrow D1 in FIG. 4) will be hereinafter referred to as a distal end side, and the opposite side of the distal end side (a side of a direction indicated by an arrow D2 in FIG. 4) will be referred to as a proximal end side. In the embodiment, the fan 50 and the nut 60 are provided on the distal end side of the shaft 46. Of the both end portions of the shaft 46 as described above, an end portion on the distal end side is a distal end portion 46a, and is subjected to threading such that the distal end portion 46a has a male thread onto which the nut 60 can be screwed. Also, although it not illustrated, part of the shaft 46 that is closer to the proximal end side than to the distal end portion 46a is formed to have a step or a collar (not illustrated) to prevent the fan 50 from moving to the proximal end side of the shaft 46.

In the embodiment, the electric motor 40 further includes a bearing 47A, a bearing 47B, a circuit board 48, and a motor case 49. The bearing 47A and the bearing 47B are provided opposite to each other with respect to the rotor core 44 in the axial direction to support the shaft 46 in such a manner as to allow the shaft to be rotated. The bearing 47A supports part of the shaft 46 that protrudes from the rotor core 44 toward the distal end side, and the bearing 47B supports part of the shaft 46 that protrudes from the rotor core 44 to the proximal end side. The circuit board 48 is located adjacent to one side of the stator 42 in the axial direction and is also located on the proximal end side as illustrated in FIG. 4. On the circuit board 48, for example, a drive circuit and a magnetic sensor are provided. The drive circuit is provided to drive the electric motor 40, and the magnetic sensor is provided to detect a rotational position of the rotor 43. To the circuit board 48, a connector 48a is attached in order to connect the circuit board 48 to a controller (not illustrated) for the outdoor unit 20. The motor case 49 is provided in such a manner as to surround the rotor 43. The motor case 49 is made of resin material and molded integral with the stator 42 and the circuit board 48. Part of the motor case 49 that is located on the proximal end side holds the bearing 47B. In part of the motor case 49 that is located on the distal end side, an opening portion is formed. To the opening portion, a bracket 49a is attached. The bracket 49a supports a bearing 47A.

The fan 50 is an impeller that is an example of a rotary member according to the embodiment. As illustrated in FIG. 4, the fan 50 is provided at the shaft 46 of the electric motor 40. In the embodiment, the fan 50 is provided at part of the shaft 46 that is located on the distal end side. The fan 50 is a propeller fan and includes a boss 51 and a plurality of blades 52. The boss 51 is provided on the axis A1, to which the axis of rotation corresponds. The boss 51 has a through-hole 51a that is formed to extend through the boss 51 along the axis A1. In the through-hole 51a, the shaft 46 of the electric motor 40 is inserted. The inside diameter of the through-hole 51a is nearly equal to the outside diameter of the shaft 46. The plurality of blades 52 are arranged on an outer periphery of the boss 51 at regular intervals in the circumferential direction. The fan 50 is made of, for example, resin material such as polypropylene.

The nut 60 is an example of a fastening member according to the embodiment. The nut 60 is used to fasten the fan 50 to the shaft 46 of the electric motor 40. In the embodiment, the nut 60 is provided on the distal end portion 46a of the shaft 46 and is screwed onto the distal end portion 46a of the shaft 46, which is subjected to threading. The nut 60 is, for example, a cap nut that covers the distal end portion of the shaft 46. The boss 51 of the fan 50 is fastened between the nut 60 and the step or the collar of the shaft 46, whereby the fan 50 is fixed to the shaft 46. Thus, when the electric motor 40 is driven, the fan 50 is rotated.

The nut 60 is made of magnetic material. The nut 60 is made of, for example, carbon steel that is soft magnetic material. The nut 60 made of magnetic material is thus attracted by the magnetized shaft 46 by magnetic force. In the embodiment, the nut 60 is provided on the distal end portion 46a of the shaft 46 that has a strong magnetic force, and is thus strongly attracted to the distal end portion 46a of the shaft 46. As a result, the force exerted by the nut 60 to fasten the fan 50 to the shaft 46 is increased by an extent to which the nut 60 is attracted by a magnetic force. More specifically, since the nut 60 is attracted to the distal end portion 46a of the shaft 46 by the magnetic force, a frictional force on a thread face of the nut 60 is increased. Therefore, a torque required to loosen the nut 60 is increased, and the nut 60 is thus harder to loosen. This, even if the nut 60 is loosened, looseness of the nut 60 can be delayed, since the nut 60 is strongly attracted to the distal end portion 46a of the shaft 46. In such a manner, since the looseness of the nut 60 can be reduced, the fan 50 does not easily fall off the shaft 46.

In the embodiment, a direction in which the nut 60 is turned when being tightened is set opposite to a direction in which the rotor 43 of the electric motor 40 is rotated. As illustrated in FIG. 4, the rotational direction of the rotor 43 is a rotational direction R1. The direction in which the nut 60 is turned when being tightened is a rotational direction R2 that is opposite to the rotational direction R1. Thus, a friction torque that is produced between the fan 50 and the seat of the nut 60 when the rotor 43 starts to rotate can be applied in the direction in which the nut 60 is tightened.

The air-sending device 21 (rotating machine) according to the embodiment includes the electric motor 40, the fan 50 (rotary member), and the nut (fastening member) 50. The electric motor 40 includes the stator 42 and the rotor 43 that includes the rotor core 44 made of magnetic material, the plurality of permanent magnets 45, and the shaft 46. The fan 50 is provided on the shaft 46, and the nut 60 is made of magnetic material and provided to fasten the fan 50 to the shaft 46. The rotor 43 is provided such that the rotor 43 is rotatable relative to the stator 42. The permanent magnets 45 are attached to the rotor core 44 such that the permanent magnets 45 are spaced from each other in the circumferential direction, and magnetic poles of the permanent magnets 45 that face the outer peripheral side of the rotor core 44 in the radial direction have the same magnetic polarity. The shaft 46 is made of magnetic material, extends through the central part of the rotor core 44 in the axial direction, and is magnetized by part of the magnetic fluxes generated from the permanent magnets 45.

In the above configuration, since the shaft 46 is magnetized, the nut 60 made of magnetic material is attracted by the shaft 46. As a result, the force exerted by the nut 60 to fasten the fan 50 to the shaft 46 is increased by an extent to which the nut 60 is attracted by the shaft 46. Thus, the nut 60 is not easily loosened, and the fan 50 does not easily fall off the shaft 46.

The outdoor unit 20 of the air-conditioning apparatus 1 according to the embodiment includes: the electric motor 40 that is provided with the stator 42 and the rotor 43 that includes the rotor core 44 made of magnetic material, the plurality of permanent magnets 45, and the shaft 46 made of magnetic material; the fan 50 provided on the shaft 46; the nut 60 made of magnetic material and provided to fasten the fan 50 to the shaft the outdoor heat exchanger 33 to which air is sent by rotation of the fan 50; and the housing 22 that houses the electric motor 40, the fan 50, the nut 60, and the outdoor heat exchanger 33. The rotor 43 is provided rotatable relative to the stator 42. The plurality of permanent magnets 45 are attached to the rotor core 44 such that the permanent magnets 45 are spaced from each other in the circumferential direction, and magnetic poles of the permanent magnets 45 that face the outer peripheral side in the radial direction have the same polarity. The shaft 46 extends through the central part of the rotor core 44 in the axial direction and is magnetized by part of the magnetic fluxes generated from the permanent magnets 45.

When the outdoor unit 20 starts or stops rotation of the fan 50 that is configured to send air to the outdoor heat exchanger 33, a strong torque is produced at the nut 60 by inertial force due to starting and stopping of the rotation of the fan 50. Even in such a case, because of provision of the above configuration, the nut 60 is not easily loosened, and the fan 50 does not easily fall off the shaft 46.

(First Modification 1)

In the above embodiment, the nut 60 is made of magnetic material. However, a surface 60a (see FIG. 4) of the nut 60 may be covered with nonmagnetic material. As the nonmagnetic material, for example, rubber material and resin material can be applied. Since the nut 60 is provided in the outdoor unit 20 that is installed outdoors, a fine magnetic substance such as iron sand may be brought into contact with the nut 60 by outside wind or for other reasons, and be adhered to the nut 60 by a magnetic force. Therefore, by covering the surface 60a of the nut 60 with nonmagnetic material in the above manner, it is possible to prevent the fine magnetic substance from adhering to the nut 60 and maintain an external appearance satisfactorily. In this case, it is preferable that a contact face of the nut 60 that is brought into contact with the shaft 46 (for example, the thread face of the nut 60) should not be covered with the nonmagnetic material.

(Second Modification)

In the above embodiment, the direction in which the nut 60 is turned when being tightened is set opposite to the direction in which the rotor 43 of the electric motor 40 is rotated; however these directions may be set the same as each other. In other words, referring to FIG. 4 in which the rotational direction of the rotor 43 is the rotational direction R1, the direction in which the nut 60 is turned wen being tightened may also be the rotational direction R1. As a result, a friction torque that is produced between the fan 50 and the seat of the nut 60 when the rotor 43 stops rotation can be applied in the direction in which the nut 60 is tightened.

Regarding the above embodiment, although it is described that the rotor core 44 of the rotor 43 has a substantially cylindrical shape, it is not a limiting. It is not indispensable that the shape of a cross section of the rotor core 44 that is perpendicular to the axial direction is a perfect circle. For example, the above cross section of the rotor core 44 may be formed in the shape of, for example, a circle having a plurality of projections that protrude from the circle. The number of the magnet insertion holes 44b formed in the rotor core 44 is not limited to five, but may be determined appropriately. Similarly, the number of the permanent magnets 45 attached to the rotor core 44 is not limited to five, but may be determined appropriately.

Although it is described that the nut 60 is provided on the distal end portion 46a of the shaft 46, it is not a limiting. That is, it suffices that at part of the shaft 46 that is located on the distal end side, the nut 60 is provided at a position where the nut 60 can fasten the fan 50. The nut 60 is described above as an example of the fastening member, but the fastening member is not limited to the nut 60. The fastening member may be, for example, a bolt. In the case where the bolt is used as the fastening member, the distal end portion 46a of the shaft 46 is formed to have, for example, a female thread to which the bolt is screwed, whereby the fan 50 can be fastened by the bolt.

The fan 50 is described above as an example of the rotary member, however, the rotary member is not limited to the fan 50, that is, another member to be rotated may be used as the rotary member. Furthermore, the air-sending device 21 of the outdoor unit 20 is described above as an example of the rotating machine according to the above embodiment, that is, for example, the air-sending device 11 of the indoor unit 10 may be applied. In addition, the rotating machine may be mounted in an electrical apparatus other than the air-conditioning apparatus 1, and in this case, it is also possible to obtain the same advantages as in the embodiment.

The above description is made with respect to the preferable embodiment of the present disclosure, but it is not a limiting. The scope of the present disclosure should not be limited to the above embodiment, and additions, omissions, replacements of a configuration or configurations, and other modifications of components can be made without departing from the spirit of the present disclosure.

INDUSTRIAL APPLICABILITY

In the above rotating machine, the air-sending device, the outdoor unit of the air-conditioning apparatus, and the air-conditioning apparatus as described above can prevent the rotary member such as a fan from easily falling off the shaft.

REFERENCE SIGNS LIST 1 air-conditioning apparatus, 10 indoor unit, 11 air-sending device, 12 electric motor, 13 fan, 20 outdoor unit, 21 air-sending device (rotating machine), 22 housing, 30A, 30B refrigerant pipe, 33 outdoor heat exchanger, indoor heat exchanger, 40 electric motor, 42 stator, 43 rotor, 44 rotor core, 44a through-hole, 44b magnet insertion hole, 44c outer peripheral surface, 44d region, 45 permanent magnet, 46 shaft, 46a distal end portion, 50 fan (rotary member), 60 nut (fastening member), A1 axis, R1, R2 rotational direction

The invention claimed is:
1. A rotating machine comprising:
an electric motor including a stator and a rotor that is rotatable relative to the stator, the rotor including
a rotor core made of magnetic material,
a plurality of permanent magnets attached to the rotor core such that the permanent magnets are spaced from each other in a circumferential direction and magnetic poles of the permanent magnets that face an outer peripheral side of the rotor core in a radius direction of the rotor core have the same magnetic polarity, and
a shaft made of magnetic material, and provided to extend through a central part of the rotor core in an axial direction of the rotor core, the shaft being magnetized by part of magnetic fluxes generated from the permanent magnets;
a rotary member to be rotated that is provided on the shaft; and a fastening member made of magnetic material, and configured to fasten the rotary member to the shaft.

2. The rotating machine of claim 1, wherein the fastening member is provided on a distal end portion of the shaft.

3. The rotating machine of claim 2, wherein
the distal end portion of the shaft is subjected to threading, and
the fastening member is a nut that is screwed onto the distal end portion of the shaft.

4. The rotating machine of claim 3, wherein a direction in which the nut is tightened is opposite to a direction in which the rotor is rotated.

5. The rotating machine of claim 3, wherein a direction in which the nut is tightened is the same as a direction in which the rotor is rotated.

6. The rotating machine of claim 1, wherein a surface of the fastening member is covered with nonmagnetic material.

7. The rotating machine of claim 1, wherein the rotary member is a fan.

8. An outdoor unit of an air-conditioning apparatus, comprising:
an electric motor including a stator and a rotor that is rotatable relative to the stator, the rotor including
a rotor core made of magnetic material,
a plurality of permanent magnets attached to the rotor core such that the permanent magnets are spaced from each other in a circumferential direction of the rotor core and magnetic poles of the permanent magnets that face an outer peripheral side of the rotor core in a radius direction of the rotor core have the same magnetic polarity, and
a shaft made of magnetic material, and provided to extend through a central part of the rotor core in an axial direction of the rotor core, the shaft being magnetized by part of magnetic fluxes generated from the permanent magnets;
a fan provided on the shaft;
a fastening member made of magnetic material, and configured to fasten the fan to the shaft;
a heat exchanger to which air is sent by rotation of the fan; and
a housing that houses the electric motor, the fan, the fastening member, and the heat exchanger.

9. An air-conditioning apparatus comprising:
an outdoor unit; and
an indoor unit connected to the outdoor unit by a refrigerant pipe,
wherein the outdoor unit comprises:
an electric motor including a stator and a rotor that is rotatable relative to the stator, the rotor including
a rotor core made of magnetic material,
a plurality of permanent magnets attached to the rotor core such that the permanent magnets are spaced from each other in a circumferential direction of the rotor core and magnetic poles of the permanent magnets that face an outer peripheral side of the rotor core in a radius direction of the rotor core have the same magnetic polarity, and
a shaft made of magnetic material, and provided to extend through a central part of the rotor core in an axial direction of the rotor core, the shaft being magnetized by part of magnetic fluxes generated from the permanent magnets;
a fan provided on the shaft;
a fastening member made of magnetic material, and configured to fasten the fan to the shaft;
a heat exchanger to which air is sent by rotation of the fan; and
a housing that houses the electric motor, the fan, the fastening member, and the heat exchanger.

* * * * *